Patented Apr. 4, 1950

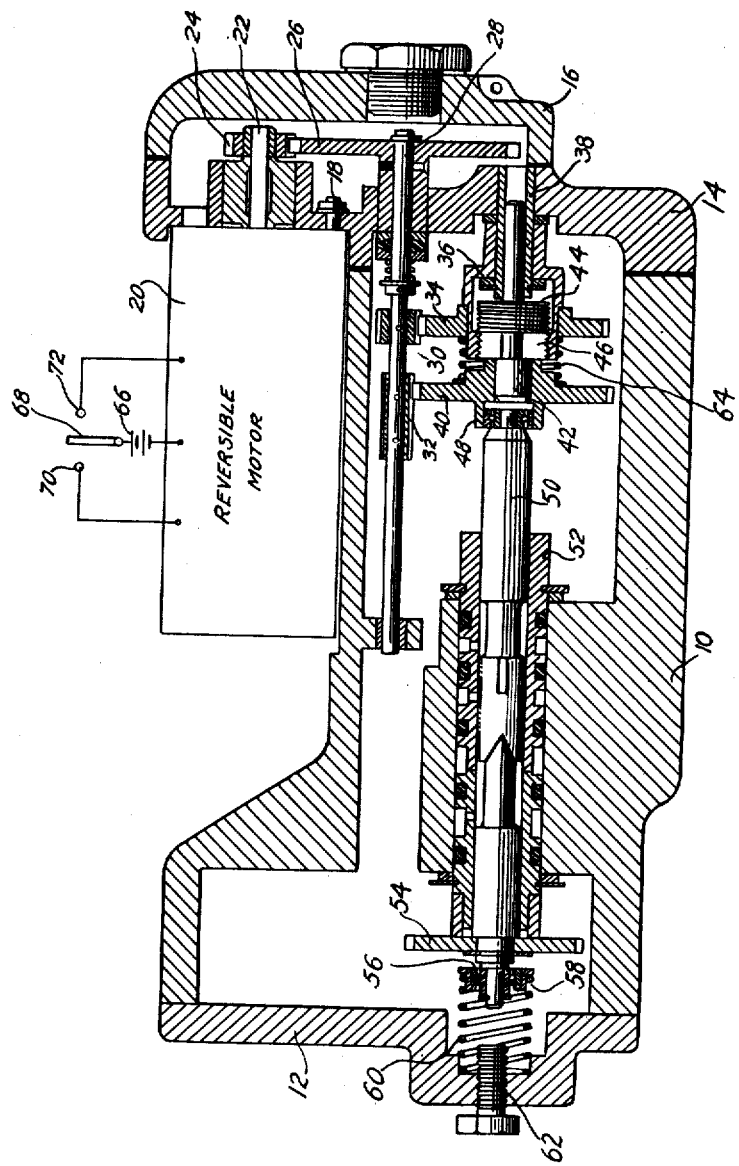

2,502,573

UNITED STATES PATENT OFFICE 2,502,573

CONTROL APPARATUS

Leighton Lee, II, Rocky Hill, Conn., assignor to Niles-Bement-Pond Company, West Hartford, Conn., a corporation of New Jersey Application September 20, 1947, Serial No. 775,321

10 Claims. (Cl. 74—405)

This invention relates to mechanism for positioning a load device by means of a reversible motor. It is particularly concerned with mechanism for connecting a motor to a load device having a limited range of travel, and which permits the motor to continue to run after the load has reached its limit of travel, without straining either the motor, the load, or the connecting mechanism.

In mechanism where a load device is driven through a limited range of travel by an electrical motor, it is common to provide limit switches for deenergizing the motor when the load reaches the end of its range of travel. A common alternative arrangement is to allow the motor to stall when the load reaches the end of its range of travel.

Limit switch arrangements such as those described tend to be complicated. The stalled motor alternative causes overheating of the motor and unnecessary waste of electrical energy due to the low impedance of the motor when stalled.

It is an object of the present invention to provide mechanism for connecting a motor to a load device to be driven through a limited range of travel, including means for permitting operation of the motor after the load has reached the end of its range of travel.

Another object of the invention is to provide mechanism of the type described which is compact, and which forms a part of the speed reduction gearing connecting the motor to the load device.

Other objects and advantages of my invention will become apparent from a consideration of the appended specification, claims and drawing, in which the single figure represents a cross sectional view of a motor and a valve positioned thereby, including connecting gearing constructed in accordance with the present invention.

There is shown in the drawing a casing comprising a central section 10, left and right end plates 12 and 14, respectively, and a right end cover plate 16. The end plate 14 extends upwardly above the central section 10, and carries, by means of bolts 18, a reversible electrical motor 20.

The motor 20 drives a shaft 22 which extends through a suitable bearing in the end plate 14, and carries a pinion 24 which mates with a gear 26, which is also journaled in a suitable bearing carried by end plate 14.

The shaft 28 projects inside the central section 10 of the casing and there carries two pinions 30 and 32. The pinion 30 engages a gear 34 which is fixed on a hollow hub member 36, which in turn is mounted on a hollow arbor 38. The hub member 36 is fixed against translation along the arbor 38 by means of suitable clamps.

The pinion 32 engages a gear 40, which is fixed for rotation and translation with a shaft 42 which extends within the hollow hub member 36 and the hollow arbor 38.

The shaft 42 has an externally threaded portion 44 which is adapted to engage a corresponding internally threaded portion 46 of the hollow hub member 36.

The gear 40 is connected by means of a bearing 48 to a valve 50, which is translated with respect to suitable ports in a sleeve 52 upon translation of gear 40 and shaft 42. The valve 50 is of the well-known spool type. The ports in sleeve 52 open into passages (not shown) drilled in the casing 10.

The valve 50 is provided at its opposite end with a gear 54, by which it may be continuously rotated from any suitable source of power. The other end of valve 50 also carries, by means of a bearing 56, a spring retainer 58. A spring 60, held between retainer 58 and the end plate 12, biases the valve 50 for movement toward the right. A screw 62 extends through the end plate 12 and provides an adjustable stop to limit the leftward movement of valve 50.

Another spring 64, retained between the gear 34 and a thrust washer adjacent the gear 40, tends to separate the two gears 34 and 40.

The pinion 32 is elongated to provide continuous engagement with gear 40 as the latter is translated. The gear ratio between pinion 30 and gear 34 is made slightly different than the gear ratio between pinion 32 and gear 40, so that as the shaft 28 is rotated, the gears 34 and 40 are turned at slightly different speeds. The hub member 36 and the shaft 42 are thereby made to rotate relative to each other. The engagement of their threaded portions 46 and 44 causes translation of shaft 42 and gear 40 as the shaft 28 is rotated.

Motor 20 is shown as being of a type having two windings, which may be selectively energized to cause rotation of the motor in opposite directions. It will be understood that any other type of reversible motor and control circuits therefor may be used without departing from my invention. Motor 20 is shown as being energized from a battery 66. The energizing circuits are shown as being controlled by a single-pole, double-throw switch, 68. When the switch 68 is in the position shown, neither winding of the motor is energized. When switch 68 is moved into engagement with contact 70, one winding is energized, and when switch 68 is moved into engagement with contact 72, the other winding is energized.

When the valve 50 reaches the end of its travel, which happens when the threaded portions 44 and 46 reach the end of their engagement, the shaft 42 and gear 40 are no longer translated with respect to each other. If the shaft 28 continues to rotate, the ends of the threads on the threaded portions 44 and 46 will slip past each other each revolution, since the two threaded portions will be held in engagement by either the spring 64 or the spring 60, depending upon which limit of movement the valve 50 has reached. If thereafter the motor 20 is reversed, the threads 24 and 26 will engage upon their first revolution in the opposite direction, and will start moving the valve toward the opposite end of its range of travel.

It may therefore be seen that whenever the valve reaches either end of its range of travel, the motor 20 is effectively disconnected from the valve and may continue to rotate freely without stressing either the motor, the valve, or any of the connecting mechanism. Since the motor will then be turning only idle gearing, the load on it will be low and the current flowing through it will be small.

It will be recognized that this mechanism, besides disconnecting the motor from its load when the load reaches its limit of travel, provides an effective speed reduction gearing between the motor and its load.

The terms and expressions I have used herein are intended as terms of description and not of limitation, and I have no intention, in the use of such terms and expressions, of excluding any equivalents of the features shown or parts thereof, but recognize that many modifications may be made within the scope of the invention claimed.

I claim as my invention:

1. Apparatus for positioning a movable load device, comprising motor means for driving said load device, a pair of elongated rotatable coaxial members having relatively short interengaging threaded portions, means operatively connecting one of said members to said load device for translation therewith, means restraining the other of said members against translation, and means including said motor means for causing relative rotation of said members, said members being effective to disconnect said motor means from said load device and thereby unload said motor means upon movement of said load device to a position in which said threaded portions are disengaged.

2. Apparatus as in claim 1, including means biasing said load device toward a position in which said members are engaged.

3. Apparatus as in claim 1, in which said motor means is reversible, and said members are effective to limit the travel of said device in either direction.

4. Apparatus as in claim 1, including means biasing said load device toward a central position in which said members are engaged.

5. Apparatus as in claim 1, in which one of said members is a sleeve having an internally threaded portion whose internal diameter is less than that of an adjacent portion and the other of said members is a rod coaxial with said sleeve and having an externally threaded portion adapted to engage said internally threaded portion and whose external diameter is less than that of an adjacent portion of said rod.

6. Apparatus as in claim 1, in which said means for causing relative rotation includes gearing for driving both said members in the same direction but at different speeds.

7. Apparatus as in claim 1, in which said means for causing relative rotation includes gearing for driving both said members in the same direction but at different speeds.

8. Apparatus as in claim 1, in which said motor means is reversible, and including means for controlling the direction of operation of said motor means.

9. Drive gearing comprising a rotatable shaft, power means for driving said shaft, a pair of gears spaced apart on said shaft and fixed thereto for concurrent rotation therewith, cooperating screw and nut members mounted parallel to said shaft, means preventing translation of one of said members, means operatively connecting the other of said members to an element to be translated upon operation of said power means, guide means supporting said members so as to permit translation of said other member until said members are disengaged, and external gears on said members cooperating with said pair of gears on said shaft, said external gears and their cooperating gears having different gear ratios so that rotation of said shaft produces translation of said other element.

10. Driving mechanism comprising cooperating screw and nut members, means preventing translation of one of said members, means operatively connecting the other of said members to an element to be translated over a limited range of travel, power means for producing relative rotation of said members, and guide means supporting said members so as to permit translation of said other member until said members are disengaged, which disengagement limits the translation of said element by said power means.

LEIGHTON LEE, II.

REFERENCES CITED

The following references are of record in the file of this patent:

UNITED STATES PATENTS

| Number | Name | Date |
|---|---|---|
| 1,924,116 | Fowler | Aug. 29, 1933 |
| 2,312,402 | Granjon | Mar. 2, 1943 |
| 2,318,814 | Strong | May 11, 1943 |
| 2,401,757 | Hardsocg | June 11, 1946 |

FOREIGN PATENTS

| Number | Country | Date |
|---|---|---|
| 552,485 | Great Britain | Apr. 9, 1943 |